United States Patent
Ramachandran et al.

(10) Patent No.: US 9,699,718 B2
(45) Date of Patent: Jul. 4, 2017

(54) SYSTEM, APPARATUS, AND METHOD TO ENABLE DOMAIN SELECTION IN A MULTIMODE DEVICE

(75) Inventors: Shyamal Ramachandran, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 13/084,400

(22) Filed: Apr. 11, 2011

(65) Prior Publication Data

US 2011/0249624 A1    Oct. 13, 2011

Related U.S. Application Data

(60) Provisional application No. 61/323,262, filed on Apr. 12, 2010.

(51) Int. Cl.
*H04W 48/18* (2009.01)
*H04W 4/14* (2009.01)
*H04W 8/18* (2009.01)
*H04W 88/06* (2009.01)

(52) U.S. Cl.
CPC ............ *H04W 48/18* (2013.01); *H04W 4/14* (2013.01); *H04W 8/18* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 8,489,108 | B2* | 7/2013 | Chan et al. | 455/453 |
| 2007/0032251 | A1* | 2/2007 | Shaheen | 455/466 |
| 2007/0183410 | A1* | 8/2007 | Song et al. | 370/352 |
| 2009/0034452 | A1* | 2/2009 | Somasundaram et al. | 370/328 |
| 2009/0052460 | A1* | 2/2009 | Coulas et al. | 370/401 |
| 2010/0144307 | A1* | 6/2010 | Wu | H04W 76/007 455/404.1 |
| 2010/0189072 | A1* | 7/2010 | Vikberg et al. | 370/331 |
| 2010/0278142 | A1* | 11/2010 | Dwyer et al. | 370/331 |
| 2010/0296421 | A1* | 11/2010 | Watfa | H04W 76/027 370/310 |
| 2010/0323695 | A1* | 12/2010 | Kallio | H04W 48/18 455/435.2 |

(Continued)

FOREIGN PATENT DOCUMENTS

CN            101631352 A      1/2010

OTHER PUBLICATIONS

Mike Dolan, "LTE-CDMA Interworking", Alcatel_Lucent, Globecomm 2009, all pages.*

(Continued)

*Primary Examiner* — Chirag Shah
*Assistant Examiner* — Srinivasa Reddivalam
(74) *Attorney, Agent, or Firm* — Ashish L. Patel

(57) ABSTRACT

Certain aspects of the present disclosure propose a method for domain selection in a multimode UE. The domain selection method may be used to select domains for short message service (SMS) and/or voice service when the UE has camped on a packet switched (PS) network such as LTE. The proposed domain selection method may take into account UE capabilities, home operator preferences, visited operator preferences, visited network capabilities, and user settings.

40 Claims, 11 Drawing Sheets

(56) References Cited

U.S. PATENT DOCUMENTS

| | | | |
|---|---|---|---|
| 2011/0077005 A1* | 3/2011 | Bhatt et al. | 455/435.1 |
| 2011/0080867 A1* | 4/2011 | Mildh | 370/328 |
| 2011/0176512 A1* | 7/2011 | Sun | H04W 68/12 370/331 |
| 2011/0191430 A1* | 8/2011 | Griot | H04L 12/5835 709/206 |
| 2011/0194505 A1* | 8/2011 | Faccin et al. | 370/329 |
| 2011/0264747 A1* | 10/2011 | Mutikainen | H04L 12/581 709/206 |
| 2012/0106324 A1* | 5/2012 | Keller et al. | 370/225 |
| 2012/0134351 A1* | 5/2012 | Ewert | H04L 12/581 370/338 |

OTHER PUBLICATIONS

3rd Generation Partnership Project; Technical Specification Group Services and System Aspects; Circuit Switched (CS) fallback in Evolved Packet System (EPS); Stage 2 (Release 9 ), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.3.0, Mar. 26, 2010 (Mar. 26, 2010), pp. 1-66, XP050402081, [retrieved on Mar. 26, 2010].

Alu: "SMS over LTE: Coexistence of CSFB with SMSoIP for SMS, and CSFB optimized solution for data cards", 3GPP Draft; S2-094475 SMS Over LTE- V2, 3rd Generation Partnership Project (3GPP), Mobile Competence Centre ; 650, Route Des Lucioles ; F-06921 Sophia-Antipolis Cedex ; France, No. Sophia; Jun. 30, 2009, Jun. 30, 2009 (Jun. 30, 2009), XP050355990, [retrieved on Jun. 30, 2009].

International Search Report and Written Opinion—PCT/US2011/032040—ISA/EPO—Jul. 21, 2011.

Qualcomm Europe: "SMS over S102", 3GPP Draft; S2-096335 (SMSOS102_23272-910), 3rd Generation Partnership Project (3GPP), Mobile Competence Centre ; 650, Route Des Lucioles ; F-06921 Sophia-Antipolis Cedex ; France, No. Elbonia; Oct. 21, 2009, Oct. 21, 2009 (Oct. 21, 2009), XP050396392, [retrieved on Oct. 21, 2009].

Research in Motion UK Limited: "SMS over SGs and provisioning of CS fallback services to Data Centric UEs", 3GPP Draft; C1-093566, 3rd Generation Partnership Project (3GPP), Mobile Competence Centre ; 650, Route Des Lucioles ; F06921 Sophia-Antipolis Cedex ; France, No. Sevilla; Aug. 24, 2009, Aug. 24, 2009 (Aug. 24, 2009), XP050382516, [retrieved on Aug. 31, 2009].

Research in Motion UK Limited: "SMS over SGs and provisioning of CSFB services to Data Centric UEs", 3GPP Draft; C1-093565, 3rd Generation Partnership Project (3GPP), Mobile Competence Centre ; 650, Route Des Lucioles ; F-06921 Sophia-Antipolis Cedex ; France, No. Sevilla; Aug. 24, 2009, Aug. 24, 2009 (Aug. 24, 2009), XP050382515, [retrieved on Aug. 31, 2009].

Telecom Italia et al: "Selective Idle Mode Camping for Optimizing User Experience with CS Fallback", 3GPP TSG SA WG2 Meeting 75, Kyoto, Japan, Aug. 31-Sep. 4 2009, [Online] vol. S2-095445, Aug. 25, 2009 (Aug. 25, 2009), pp. 1-12, XP002633837, Retrieved from the Internet: URL:ftp://ftp.3gpp.org/TSG_SA/WG2_Arch/TSGS2_75_Kyoto/Docs/S2-095445.zip> [retrieved on Apr. 21, 2011].

* cited by examiner

| Op Voice Setting \ Op SMS Setting | PS Preferred | PS Not Allowed |
|---|---|---|
| CS voice only | CS/PS | CS/PS |
| CS voice preferred | CS/PS | CS/PS |
| PS voice only | CS_SMS/PS | CS_SMS/PS |
| PS voice preferred | CS/PS | CS/PS |

FIG. 4

SYSTEM, APPARATUS, AND METHOD TO ENABLE DOMAIN SELECTION IN A MULTIMODE DEVICE

CLAIM OF PRIORITY UNDER 35 U.S.C. §119

The present application for patent claims priority to U.S. Provisional Application No. 61/323,262, entitled, "System, Apparatus, and Method to Enable Domain Selection in a Multimode Device," filed Apr. 12, 2010, and assigned to the assignee hereof and hereby expressly incorporated by reference herein.

TECHNICAL FIELD

Certain aspects of the present disclosure generally relate to wireless communications and, more particularly, to methods for domain selection in a multimode device.

BACKGROUND

The third Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 50 megabits per second (Mbps) and a downlink speed of up to 100 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. The LTE is also expected to improve spectral efficiency in 3G networks, allowing carriers to provide more data and voice services over a given bandwidth. The LTE encompasses high-speed data, multimedia unicast and multimedia broadcast services.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

The LTE-Advanced is an evolving mobile communication standard for providing fourth generation (4G) services. Being defined as 3G technology, the LTE does not meet the requirements for 4G also called International Mobile Telecommunications-Advanced (IMT-Advanced) as defined by the International Telecommunication Union such as peak data rates up to 1 Gbit/s. Besides the peak data rate, the LTE-Advanced also targets faster switching between power states and improved performance at the cell edge.

SUMMARY

Certain aspects of the present disclosure provide a method for wireless communications. The method generally includes determining a multi-mode device that has camped on a packet switched radio access technology (RAT) network is capable of supporting a voice service, determining an attach type from a plurality of attach types based on parameters of a home network and voice service capability, selecting a first domain from a first plurality of domains for the voice service over the RAT utilizing the attach type and one or more parameters, wherein the first plurality of domains comprise single carrier-circuit switched fall back (1xCSFB) domain, and if the device is capable of supporting a short message service (SMS) service, selecting, from a second plurality of domains, a second domain for SMS services over the RAT utilizing the one or more parameters and information about the first domain.

Certain aspects of the present disclosure provide a method for wireless communications. The method generally includes determining an attach type based on one or more parameters of a home operator and capabilities of a device and selecting, from a plurality of domains, a domain for short message service (SMS) over a packet switched radio access technology (RAT) utilizing one or more parameters comprising one or more of home operator preferences, visited operator preferences, visited operator capabilities, and user settings, wherein the plurality of domains comprise SMS over S102 interface.

Certain aspects of the present disclosure provide an apparatus for wireless communications. The apparatus generally includes means for determining a multi-mode device that has camped on a packet switched radio access technology (RAT) network is capable of supporting a voice service, means for determining an attach type from a plurality of attach types based on parameters of a home network and voice service capability, means for selecting a first domain from a first plurality of domains for the voice service over the RAT utilizing the attach type and one or more parameters, wherein the first plurality of domains comprise single carrier-circuit switched fall back (1xCSFB) domain, means for selecting, from a second plurality of domains, a second domain for SMS services over the RAT utilizing the one or more parameters and information about the first domain if the device is capable of supporting a short message service (SMS) service.

Certain aspects of the present disclosure provide an apparatus for wireless communications. The apparatus generally includes means for determining an attach type based on one or more parameters of a home operator and capabilities of a device and means for selecting, from a plurality of domains, a domain for short message service (SMS) over a packet switched radio access technology (RAT) utilizing one or more parameters comprising one or more of home operator preferences, visited operator preferences, visited operator capabilities, and user settings, wherein the plurality of domains comprise SMS over S102 interface.

Certain aspects of the present disclosure provide an apparatus for wireless communications. The apparatus generally includes at least one processor configured to determine a multi-mode device that has camped on a packet switched radio access technology (RAT) network is capable of supporting a voice service, determine an attach type from a plurality of attach types based on parameters of a home network and voice service capability, select a first domain from a first plurality of domains for the voice service over the RAT utilizing the attach type and one or more parameters, wherein the first plurality of domains comprise single carrier-circuit switched fall back (1xCSFB) domain, and, if the device is capable of supporting a short message service (SMS) service, selecting, from a second plurality of domains, a second domain for SMS services over the RAT utilizing the one or more parameters and information about the first domain; and a memory coupled with the at least one processor.

Certain aspects of the present disclosure provide an apparatus for wireless communications. The apparatus generally includes at least one processor configured to determine an attach type based on one or more parameters of a home operator and capabilities of a device and select, from a plurality of domains, a domain for short message service (SMS) over a packet switched radio access technology (RAT) utilizing one or more parameters comprising one or more of home operator preferences, visited operator preferences, visited operator capabilities, and user settings, wherein the plurality of domains comprise SMS over S102 interface; and a memory coupled with the at least one processor.

Certain aspects of the present disclosure provide computer program product comprising a computer readable medium having instructions stored thereon. The instructions are executable by one or more processors for determining a multi-mode device that has camped on a packet switched radio access technology (RAT) network is capable of supporting a voice service, determining an attach type from a plurality of attach types based on parameters of a home network and voice service capability, selecting a first domain from a first plurality of domains for the voice service over the RAT utilizing the attach type and one or more parameters, wherein the first plurality of domains comprise single carrier-circuit switched fall back (1xCSFB) domain, and if the device is capable of supporting a short message service (SMS) service, selecting, from a second plurality of domains, a second domain for SMS services over the RAT utilizing the one or more parameters and information about the first domain.

Certain aspects of the present disclosure provide computer program product comprising a computer readable medium having instructions stored thereon. The instructions are executable by one or more processors for determining an attach type based on one or more parameters of a home operator and capabilities of a device and selecting, from a plurality of domains, a domain for short message service (SMS) over a packet switched radio access technology (RAT) utilizing one or more parameters comprising one or more of home operator preferences, visited operator preferences, visited operator capabilities, and user settings, wherein the plurality of domains comprise SMS over S102 interface.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates a table for determining attach type for a UE while visiting another network based on voice domain preference and SMS domain preference of its home network operator, in accordance with certain aspects of the present disclosure.

DETAILED DESCRIPTION

Figure 1:
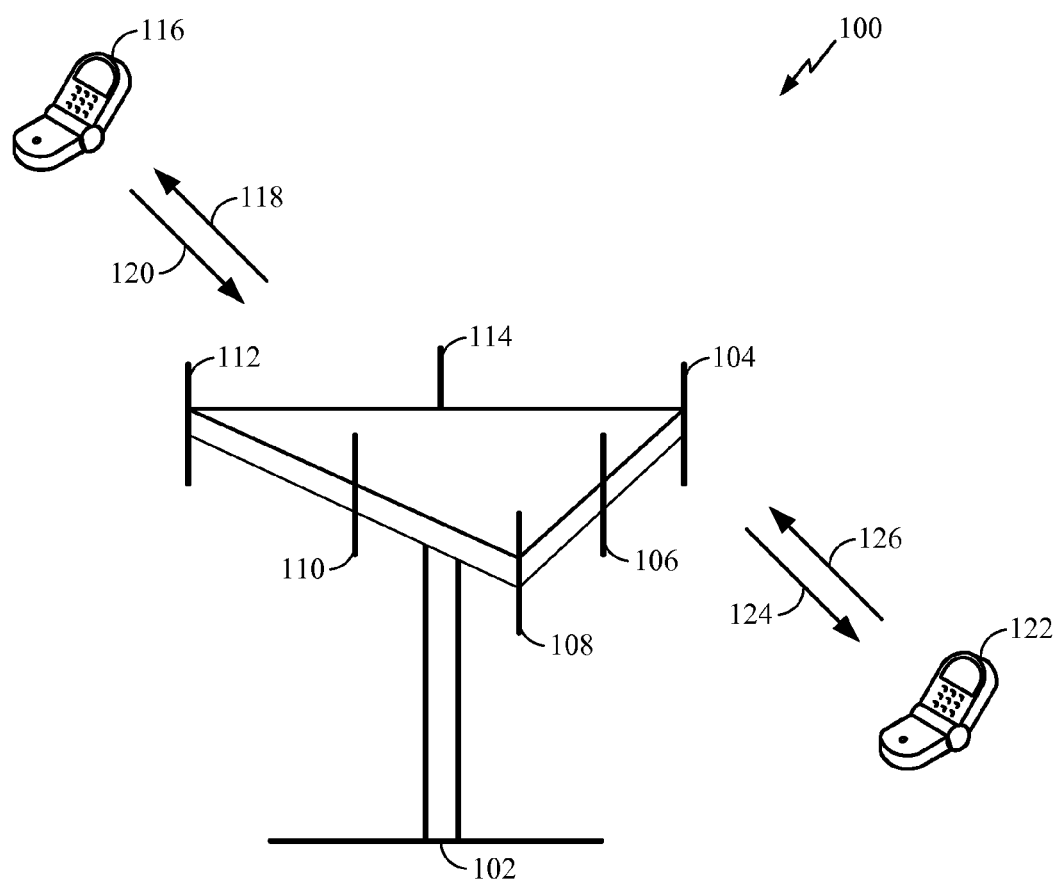
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use a different frequency for communication. For example, forward link 120 may use a different frequency than that used by reverse link 118.

Each group of antennas and/or the area in which they are designed to communicate is often referred to as a sector of the access point. In an aspect, antenna groups each are designed to communicate to access terminals in a sector of the areas covered by access point 102.

In communication over forward links 120 and 126, the transmitting antennas of access point 102 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology.

Figure 2:
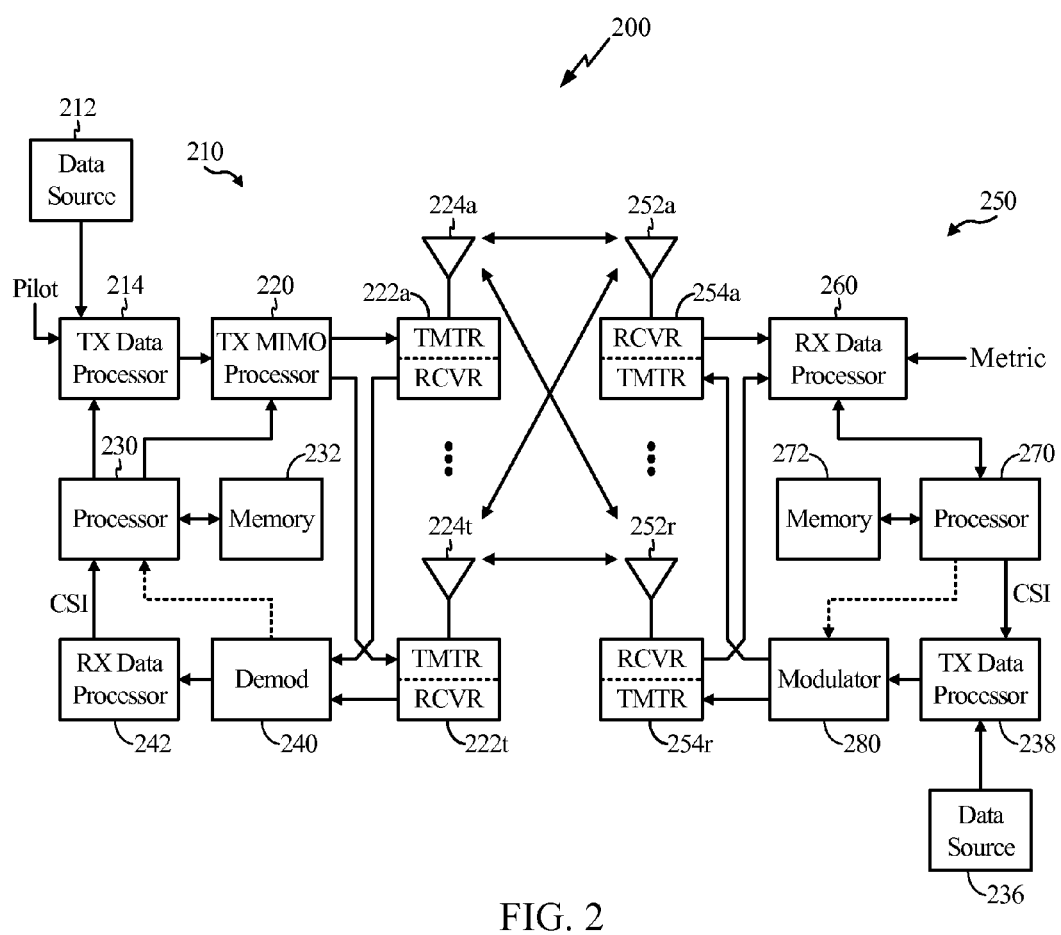
FIG. 2 illustrates a block diagram of a communication system, in accordance with certain aspects of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled to a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Figure 3:
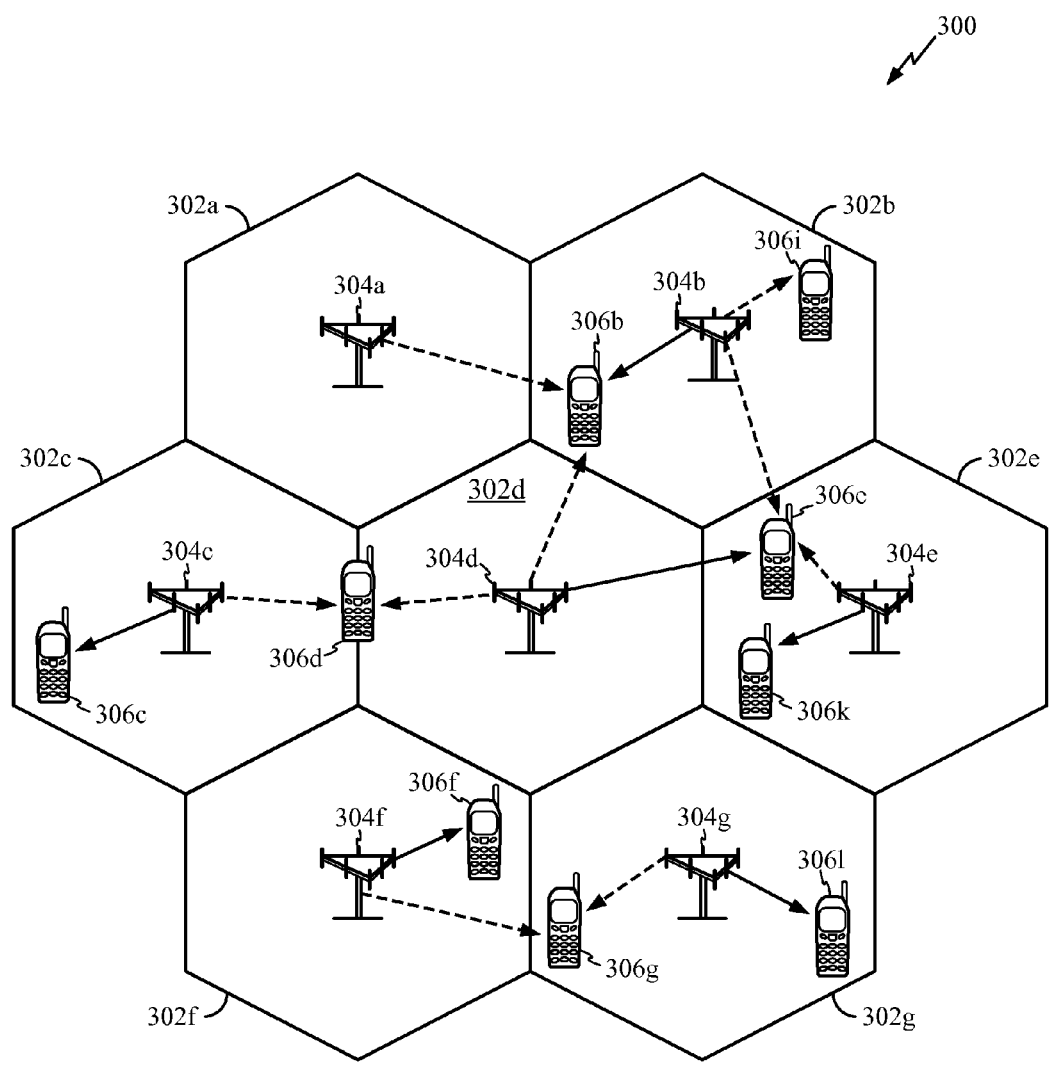
FIG. 3 illustrates an example wireless communication system, in accordance with certain aspects of the present disclosure.

FIG. 3 illustrates an example wireless communication system 300 configured to support a number of users, in which various disclosed aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various UEs 306, including UEs 306b-306j, are dispersed throughout the system.

Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, and macro cells 302a-302g may cover a small geographic area. For certain aspects, two or more service providers that utilize similar or different standards may provide service for a common geographic area. For example, one of the providers may use LTE over 3GPP and the other may use LTE over 3GPP2 standard. A multimode device may be capable of selecting a provider for voice, short message service (SMS), and other services from the list of available providers in the area.

Certain aspects of the present disclosure propose a method for domain selection in a multimode UE. The domain selection method may be used to select domains for SMS and/or voice service when the UE has camped on a packet switched (PS) network such as LTE. The proposed domain selection method may take into account UE capabilities, home operator preferences, visited operator preferences, visited network capabilities, and user settings.

For certain aspects, a UE, depending on its capabilities, may be able to access voice services over LTE using a domain, such as circuit switched fall back (CSFB), single carrier CSFB (1xCSFB), or voice over internet protocol multimedia subsystem (IMS). In addition, a UE may be able to access SMS services over LTE using SMS over non-access stratum (NAS), or SMS over IMS.

For certain aspects, if a UE is unable to access voice and/or SMS services over a radio access technology (RAT) such as LTE, the UE may temporarily disable the RAT and select a different RAT where these essential services are available.

Although the current document is mostly focusing on domain selection for voice and SMS services, similar ideas may be used to select domain for other services, all of which will fall into scope of the present disclosure.

For certain aspects, if a UE is provisioned to prefer SMS services over IMS, and the UE is able to successfully perform IMS registration, the network may provide SMS services to the UE over the IMS. For another aspect, if the UE is provisioned to prefer voice services over the IMS, and the UE is able to successfully perform IMS registration, the network may provide voice services to the UE over the IMS.

The present document addresses domain selection while a UE has camped on an E-UTRAN network. The various "domains" that the UE can choose from may be circuit switched (CS) domains via UTRAN/GERAN/1xRTT and IMS over E-UTRAN directly. In which UTRAN stands for Universal Terrestrial Radio Access Network, E-UTRAN stands for evolved UTRAN, GERAN stands for Global System for Mobile communications (GSM)/Enhanced Data rates for GSM Evolution (EDGE) Radio Access Network, and 1xRTT stands for single carrier Radio Transmission Technology.

The proposed domain selection algorithm may support SMS domain selection on SMS-only devices, and voice and SMS domain selection on devices that are capable of both SMS and voice services, treating voice as the primary service.

For certain aspects, domain selection may be performed independent of other services requiring IMS services. For example, a device may use the proposed domain selection method regardless of whether or not the device is already registered for IMS for another service (that does not include voice and SMS services).

For certain aspects, based on certain triggers, the UE may re-attempt domain selection. For example, if E-UTRAN was disabled to get voice services, or if multiple domains are available and the UE is not presently using the most preferred domain, the UE may perform the domain selection algorithm again. It should be noted that the domain selection algorithm may only be utilized while UE is not active in a CS/PS call.

For certain aspects, if both 1xRTT CSFB and 3GPP CSFB domains are available, the UE may select either 1x or 3GPP for CSFB. The UE may not be registered for both 3GPP CSFB and 1xCSFB simultaneously. For certain aspects, the UE may give more priority to the 3GPP CSFB compared to 1xCSFB to reduce over the air (OTA) signaling cost.

A UE may operate under CS or PS modes in UTRAN/GERAN. However, mode of operation of the UE on UTRAN/GERAN may be independent of mode of operation of the UE on E-UTRAN. For example, the UE may be provisioned to use IMS voice over LTE but CS voice over UTRAN/GERAN, if the network deployment is such that the IMS core is reachable only over the LTE RAT. Therefore, the UE may retain the legacy mechanism presently used for specifying UE mode setting (CS or PS) over UTRAN/GERAN.

For certain aspects, a SMS-Only UE may support a flag (e.g., SMS_MANDATORY) to indicate whether SMS service over LTE is mandatory. If SMS is unavailable over LTE, the SMS_MANDATORY may indicate that the UE may leave LTE to obtain SMS services over 2G/3G. (e.g., SMS_MANDATORY=ON), or stay on LTE without SMS (e.g., SMS_MANDATORY=OFF).

For certain aspects, a voice capable UE may support a parameter (e.g., Voice_Domain_Preference_E_UTRAN) to allow the home operator to specify the UE's voice domain preference. This parameter may take one of the following four values: i) CS Voice Only (e.g., CS_ONLY), ii) CS Voice preferred, IMS PS Voice secondary (e.g., CS_PREF), iii) IMS PS Voice preferred, CS Voice secondary (e.g., PS_PREF), or iv) PS Voice only (e.g., PS_ONLY).

For certain aspects a voice-capable UE may store the UE's usage setting, such as voice centric (e.g., voice service is more important than data services), or data centric (e.g., data services are more important than voice service), and use the usage setting in determining a domain for voice or SMS services.

LTE Attach Procedure

A UE may need to register with a network to receive services that require registration. This registration may be described as network attachment. For certain aspects, if the UE is not capable of voice services (e.g., an SMS-only device), type of LTE attach may be 'combined attach for "SMS only"' if the preferred domain for SMS is 'PS not allowed'. Similarly, type of LTE attach may be 'EPS attach' if a PS domain is preferred for SMS (e.g., 'PS_SMS_PREF'). For certain aspects, similar attach types may be considered if the UE is voice capable but does not support 3GPP CSFB.

If the UE is voice-capable and supports 3GPP CSFB, the type of LTE Attach may be determined as shown in FIG. 4.

FIG. 4 illustrates a table for determining attach type for a UE while visiting another network based on voice domain preference and SMS domain preference of its home network operator. As illustrated, if voice domain preference is CS_only or CS preferred (e.g., CS_PREF) the UE may perform Combined Attach. If PS is preferred for SMS domain (e.g., PS_SMS_PREF), and if voice domain preference is PS_PREF or PS_only, then EPS attach may be used. If PS is not allowed for SMS, and if voice domain preference is PS_PREF or PS_only, the attach type may be Combined attach for "SMS only".

A UE may determine visited network support for 3GPP CSFB and SMS over NAS services during the LTE Attach procedure. Visited network support for these services may be used in determining the UE's voice and SMS domain. For certain aspects, the UE may also determine the visited network's support for 1xCSFB. This indication may be used in determining the voice or SMS domain for the UE.

For certain aspects, the UE may determine whether or not 1xCSFB is supported by the visited network by analyzing the System Information Broadcast (SIB) messages received from the visited network. For example, one of the SIBs, such as the SIB8 may carry information about support for 1xCSFB (e.g., an information element related to 1x registration). When the UE receives the first system information block (e.g., SIB1), the UE may determine whether or not SIB8 is scheduled by analyzing the information included in the SIB1. For example, if SIB1 indicates that SIB8 is not scheduled, the UE may conclude that 1xCSFB is not supported. If SIB1 indicates that SIB8 is present, the UE may conclude that 1xCSFB is supported.

For certain aspects, the UE may determine whether or not the visited network supports IMS Voice by analyzing the response received from the visited network during the LTE attach procedure. It should be noted that support for IMS by the visited network does not ensure that the UE will get IMS voice services. The UE may still need to successfully perform IMS registration to guarantee IMS service.

Domain Selection Procedure

Figure 5:
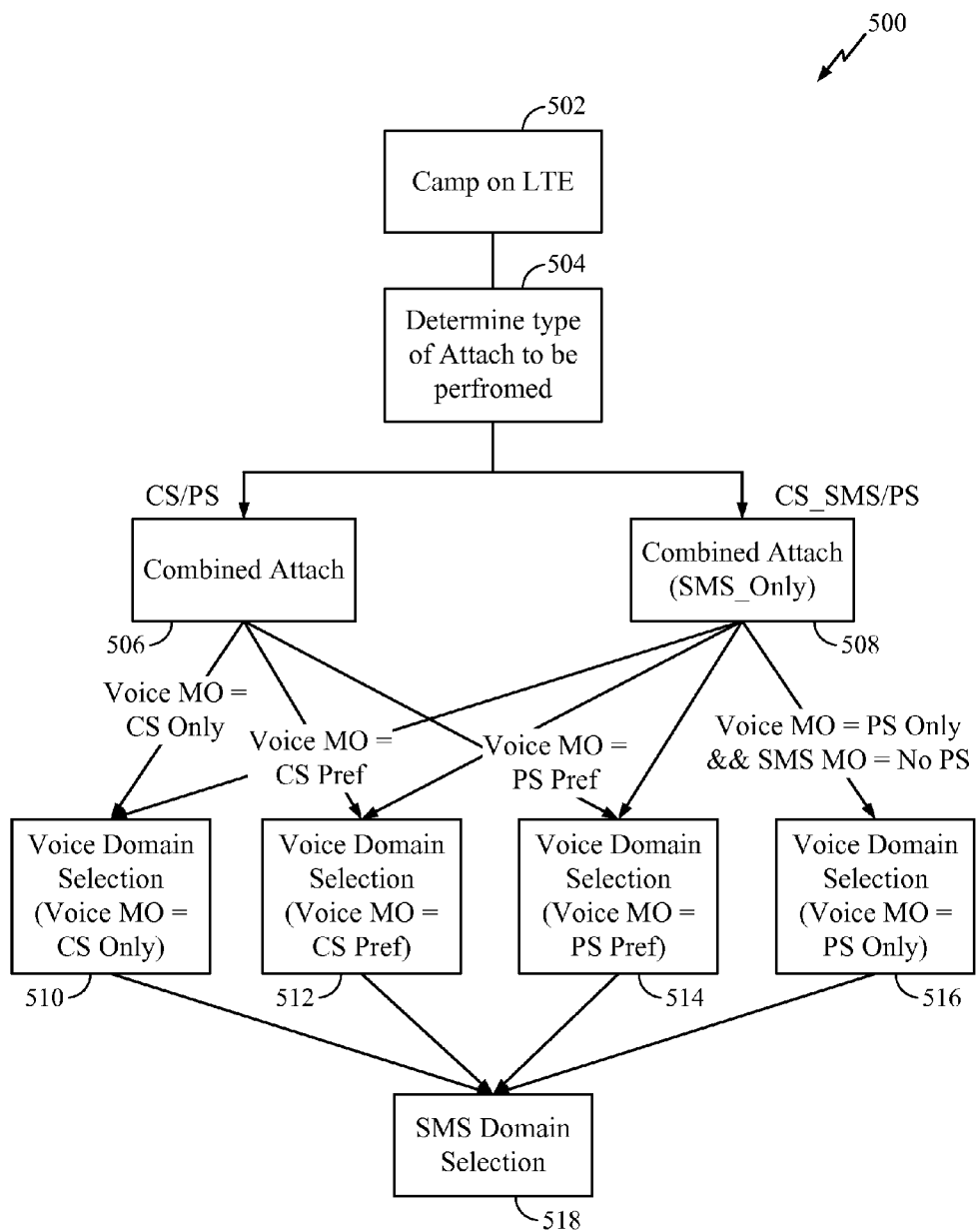
FIG. 5 illustrates an example flow diagram of the proposed domain selection method, in accordance with certain aspects of the present disclosure.

FIG. 5 illustrates an example flow diagram of the proposed domain selection method, in accordance with certain aspects of the present disclosure. At 502, a UE may camp on a network such as LTE. At 504, the UE determines type of attach to be performed. If the attach type is CS/PS, the UE performs a combined attach (at 506). If the attach type is CS_SMS/PS, the UE performs a combined attach (SMS_only). Depending on the mode of preference for voice service, the UE may perform one of the voice domain selection procedures in blocks 510, 512, 514 or 516. At 518, the UE performs a SMS domain selection procedure.

Figure 6:
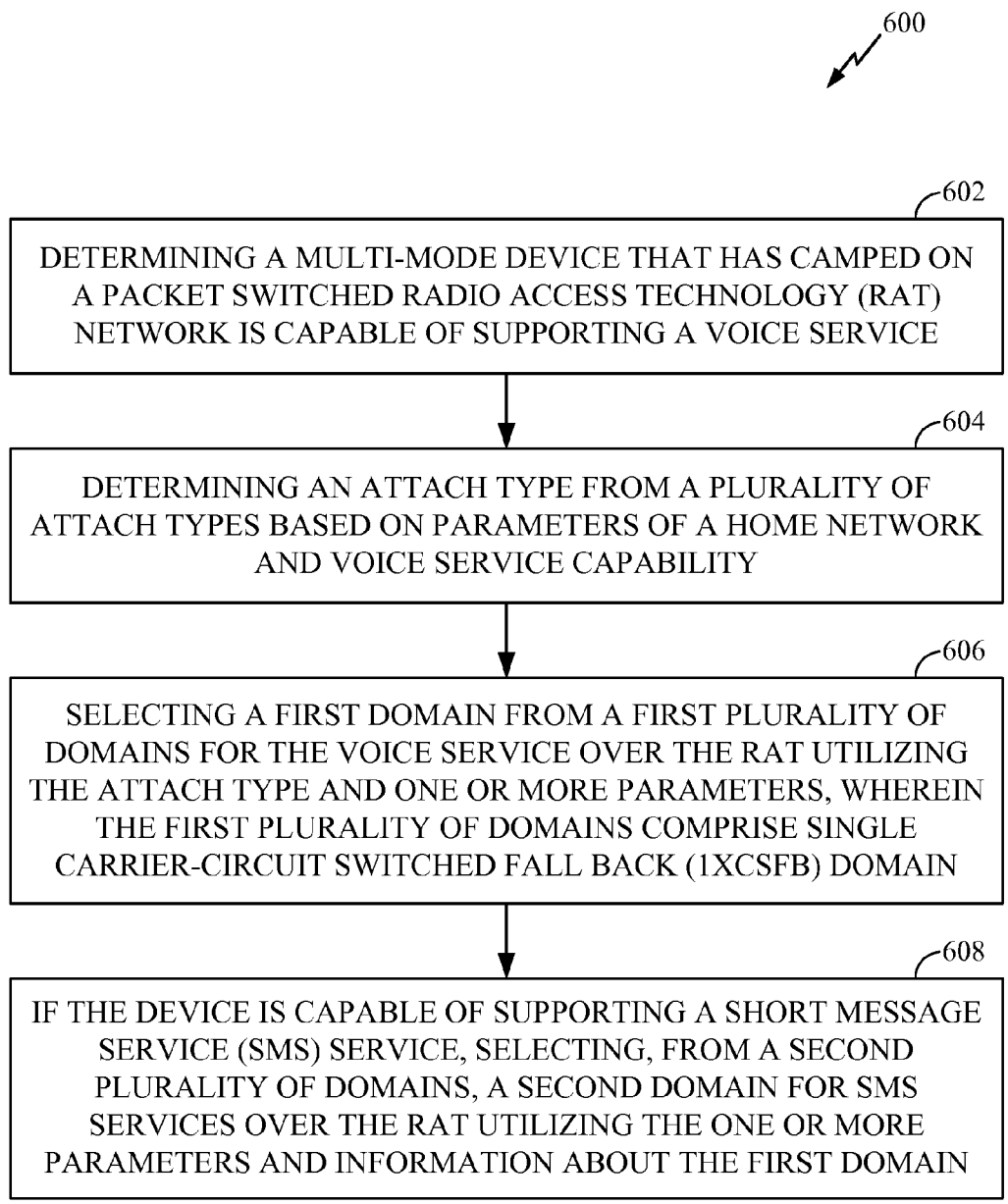
FIG. 6 illustrates example operations for determining a domain for voice or SMS services, in accordance with certain aspects of the present disclosure.

FIG. 6 illustrates example operations 600 for determining a domain for voice or SMS services, in accordance with certain aspects of the present disclosure. At 602, a multi-mode device that has camped on a packet switched radio access technology (RAT) network determines if it is capable of supporting a voice service. At 604, the device determines an attach type from a plurality of attach types based on parameters of a home network and voice service capability. At 606, the device selects a first domain from a first plurality of domains for the voice service over the RAT utilizing the attach type and the one or more parameters, wherein the first plurality of domains comprise single carrier-circuit switched fall back (1xCSFB) domain. At 608, if the device is capable of supporting a short message service (SMS) service, the device selects, from a second plurality of domains, a second domain for SMS services over the RAT utilizing the one or more parameters and information about the first domain.

Figure 7:
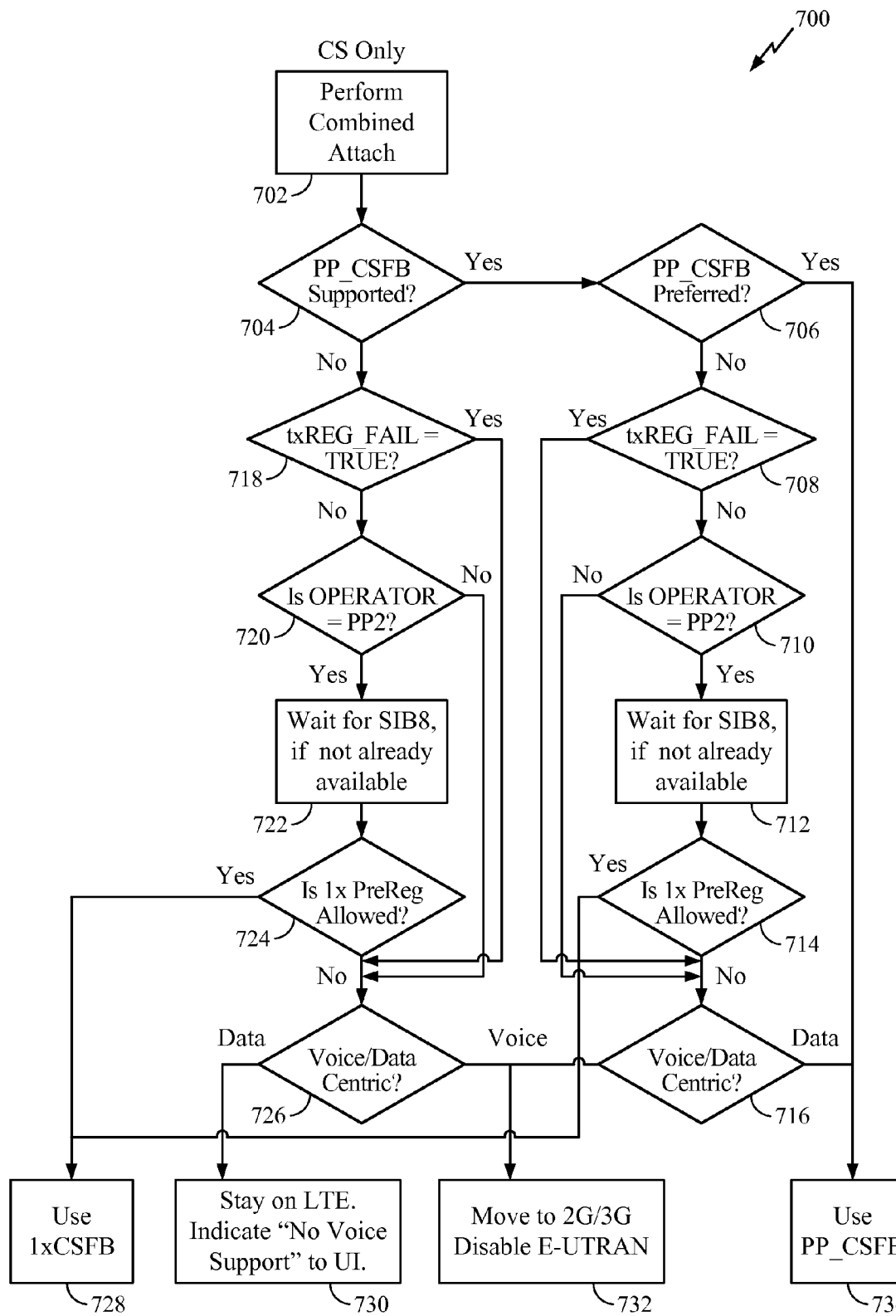
FIG. 7 illustrates an example voice domain selection procedure for CS only UEs, in accordance with certain aspects of the present disclosure.

FIG. 7 illustrates an example voice domain selection procedure 700 for CS only UEs (block 510 in FIG. 5 in more detail), in accordance with certain aspects of the present disclosure. At 702, the UE performs a combined attach. At 704, the UE checks if 3GPP CSFB (e.g., PP_CSFB) is supported. If yes, at 706, the UE determines if PP_CSFB is preferred or not. If yes, at 734, the UE selects PP_CSFB. If PP_CSFB is not preferred, the UE checks if 1x registration has failed previously (1x_REG_FAIL=TRUE, 708). If yes, the device selects PP_CSFB. If 1x registration has not failed previously, the UE checks if the operator is 3GPP2 (at 710). If yes, the UE waits to receive SIB8, if it is not already available (712). If 1x pre-registration is allowed (714), the UE selects 1x CSFB at 728. If 1x pre-registration is not allowed, for voice-centric UEs, the UE chooses to move to a 2G/3G network and disable E-UTRAN (732). For data-centric UEs (716), the UE selects a 3GPP CSFB (e.g., PP_CSFB) domain.

If PP_CSFB is not supported (at 704), and 1x registration has not failed previously (718), and if the operator is 3GPP2 (720), the UE waits to receive SIB8 (722). Then, at 724, if 1x preregistration is allowed, the UE selects the 1xCSFB domain. If 1x preregistration is not allowed, a data centric UE may stay on LTE and indicate that it is unable to support voice (730), and a voice centric UE may move to 2G/3G network and disable E-UTRAN (732).

Figure 8:
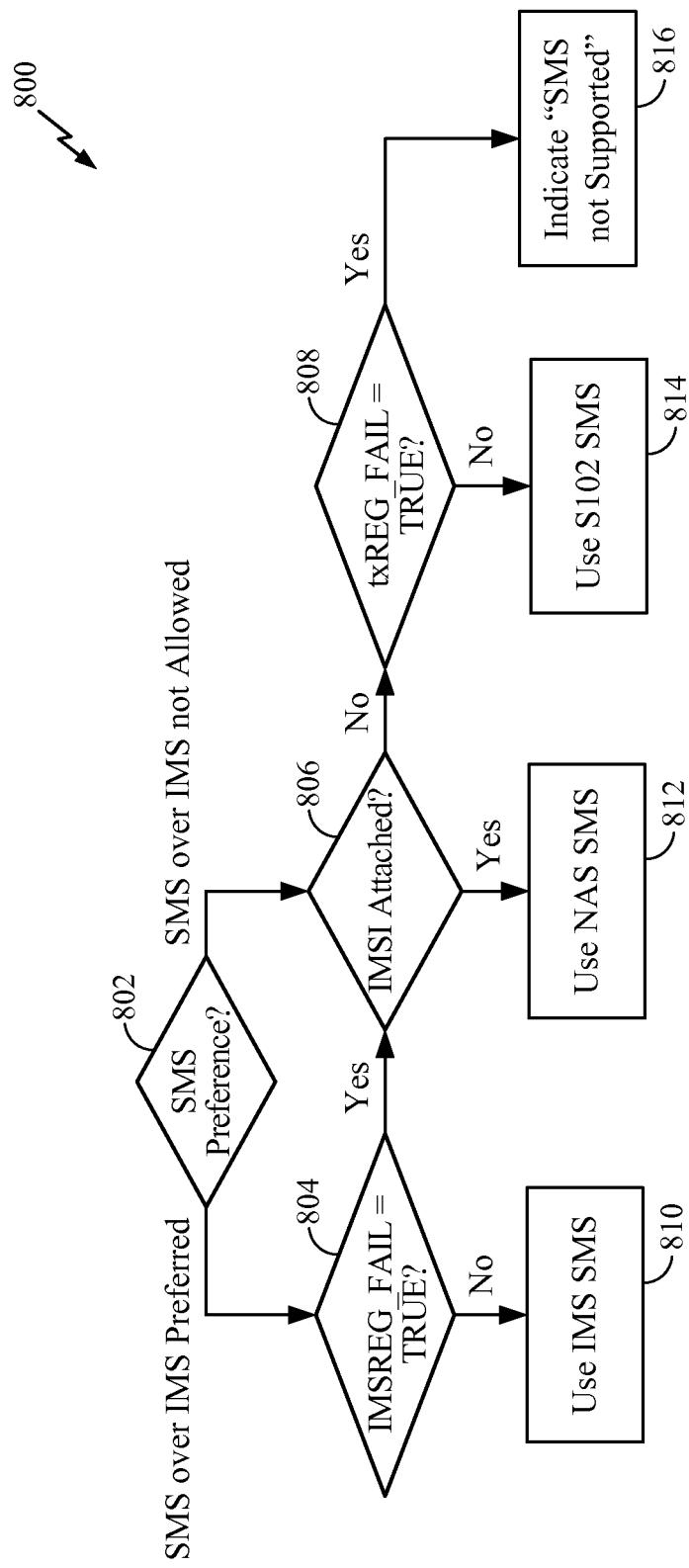
FIG. 8 illustrates an example flow diagram for SMS domain selection after the voice domain is selected, in accordance with certain aspects of the present disclosure.

FIG. 8 illustrates an example flow diagram 800 for SMS domain selection after the voice domain is selected (block 518 in FIG. 5, or block 608 in FIG. 6), in accordance with certain aspects of the present disclosure. At 802, the UE determines its preference for SMS services. If SMS over IMS is preferred, and if IMS registration has not failed previously (e.g., during voice domain selection), the UE selects IMS SMS domain (810). If IMS registration has failed previously (IMSREG_FAIL=TRUE, 804), and if the UE is IMSI attached 806, it selects NAS SMS domain 812. If the UE is not IMSI attached, and if 1x registration has not failed previously, the UE uses S102 domain for SMS (814). If 1x registration has failed (1xREG_FAIL=TRUE, 808), the UE indicates that SMS is not supported (816).

The UE may execute the proposed domain selection procedure whenever the UE's system selection procedures determine that an LTE PLMN is the most preferred system that the UE could camp on.

A voice-capable UE may perform voice domain selection followed by SMS domain selection. The voice domain selection procedure used by a voice capable UE depends on preferences of the home network.

When 1xCSFB is determined to be the preferred voice domain, the UE may perform 1x registration procedures as needed. When IMS voice is determined to be the preferred voice domain, the UE may perform IMS registration procedures as needed. Similarly, when PS_SMS is determined to be the preferred SMS domain, the UE may perform IMS registration procedures as needed.

For certain aspects, after having selected a domain for voice and/or SMS services, the domain selection procedure may be rerun if at least one of the following events is triggered: i) If 1x stack reports a hard failure, therefore, the domain selection function may discount 1xCSFB as a viable voice option. ii) If 1x stack reports successful registration. It should be noted that this trigger may be possible only if the 1xRTT stack is allowed to run registration attempts even after declaring hard failure once. iii) If IMS stack reports a hard failure. As a result, the domain selection procedure may discount IMS as a viable voice or SMS option. iv) If IMS stack reports successful registration—This trigger is possible only if the IMS stack is allowed to run registration attempts even after declaring hard failure once. v) If there is a change in visited network's support for SMS and voice services, management objects or change in UE usage setting. vi) Whenever the UE camps on LTE again or whenever the UE changes RATs to camp on LTE.

For certain aspects, if the UE is already registered with the LTE, while re-running the domain selection procedure, the UE may not perform LTE attach procedures again. Similarly, while rerunning the domain selection procedure, the UE may not perform IMS registration again, if it is already IMS registered on the same domain.

A "voice centric" UE that is unable to access voice services over LTE may disable LTE upon unavailability of service over LTE for a duration specified by a parameter (e.g., LTE_DISABLE_DURATION). For certain aspects, the LTE_DISABLE_DURATION parameter may show a time duration for which a voice-centric UE may disable access to public land mobile networks (PLMNs) where voice services over LTE are determined to be unavailable. The LTE_DISABLE_DURATION parameter may take one of the following values: time duration for which LTE PLMNs without voice support are disabled, or a predefined value (e.g., 0x00) implying that LTE PLMN may not be disabled, or another predefined value (e.g., 0xFF) implying that LTE PLMN may be disabled until the UE is power-cycled.

For certain aspects, when a timer that is initialized by the LTE_DISABLE_DURATION expires, the UE may enable LTE camping for the temporarily forbidden PLMN.

For certain aspects, disabling LTE may be achieved by adding temporary forbidding functionality to the "Forbidden for EPS Services" list. The UE may also continue to allow access to the same PLMN using the RATs it may be capable of Or, the UE may continue to allow searching on LTE for system selection purposes.

Upon disabling the LTE RAT, the UE may execute system selection procedures to find the highest priority system to camp on. Depending on the system selection databases, this could be a different RAT on the same PLMN or LTE RAT on a different PLMN.

For certain aspects, if the UE finds service on a different RAT on a PLMN for which LTE access has been temporarily disabled, the UE may indicate that it is not LTE-capable in the RAT-specific capability exchange procedures.

For certain aspects, if the UE finds service on a different RAT on a PLMN for which LTE access has been temporarily disabled, the UE may not perform idle-mode mobility procedures such as cell reselection back to LTE.

Figure 9:
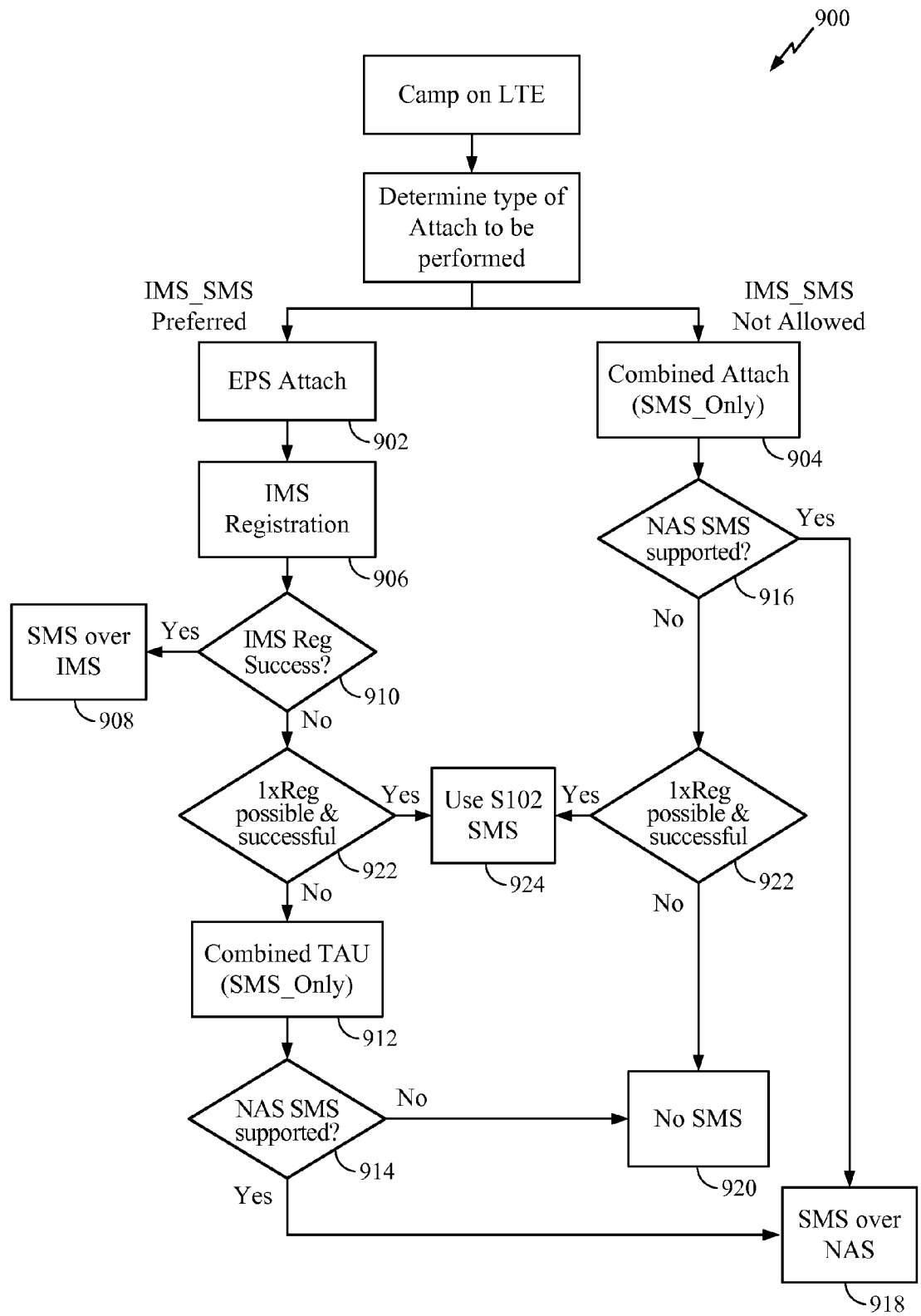
FIG. 9 illustrates an example flow diagram for a UE that only supports SMS services, in accordance with certain aspects of the present disclosure.

A UE that is not capable of voice may perform SMS domain selection as described in FIG. 9. FIG. 9 illustrates an example flow diagram for a UE that only supports SMS services, in accordance with certain aspects of the present disclosure. As illustrated, after camping on LTE and determining the attach type, if IMS_SMS is preferred, the UE performs an EPS attach (902) and IMS registration (906). If IMS registration is successful, SMS over IMS domain is selected (908). If IMS registration is not successful, the UE may check if 1x registration is possible and successful (922). If 1x registration is possible, the UE may select SMS over S102 interface (924). The S102 is an interface between a mobile management entity (MME) and the 1xCS inter working solution (IWS) to relay the 1xCS signaling messages.

If 1x registration is not possible, combined tracking area update (TAU) (SMS_only) 912 may be used. If NAS SMS is supported (914), the UE uses SMS over NAS (918).

If IMS_SMS is not allowed, at 904, the UE performs a combined attach (SMS_only). If NAS SMS is not supported (916), and if 1x registration is not possible, the UE indicates that SMS service is not available (920).

Figure 10:
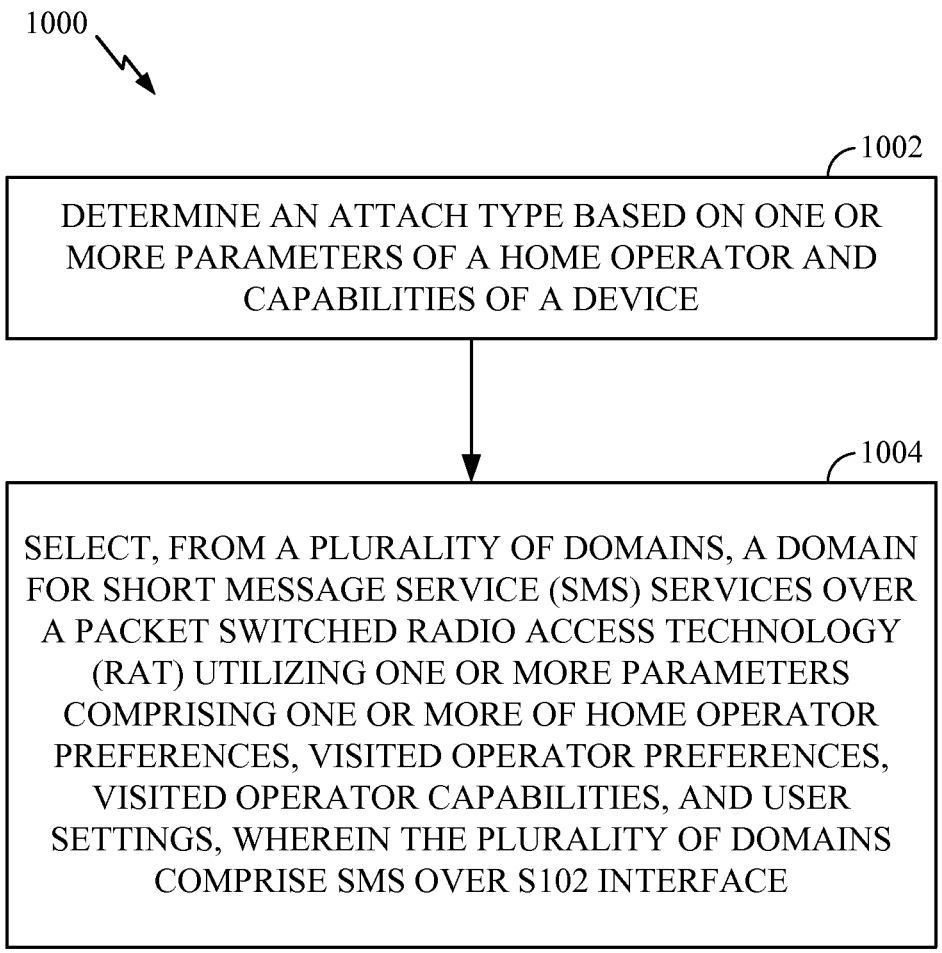
FIG. 10 illustrates example operations for determining a domain for SMS service, in accordance with certain aspects of the present disclosure.

FIG. 10 illustrates example operations 1000 for determining a domain for SMS service, in accordance with certain aspects of the present disclosure. These operations may be performed by a device that capable of supporting SMS service, but may not be capable of voice service. At 1002, a device (e.g., a UE) determines an attach type based on one or more parameters of a home operator and its capabilities. At 1004, the device selects, from a plurality of domains, a domain for short message service (SMS) services over a packet switched radio access technology (RAT) utilizing one or more parameters comprising one or more of home operator preferences, visited operator preferences, visited operator capabilities, and user settings. The plurality of domains may comprise SMS over S102 interface.

Figure 11:
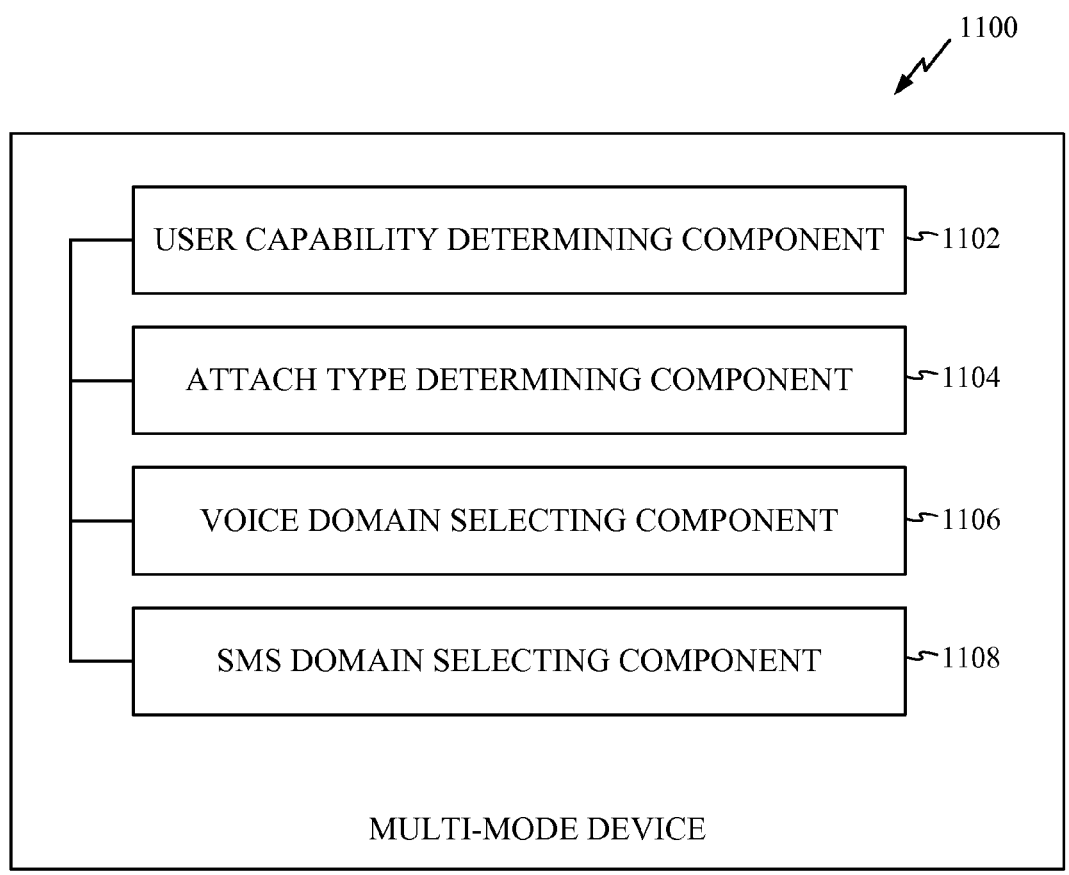
FIG. 11 illustrates a functional block diagram of a multimode device, in accordance with certain aspects of the present disclosure.

FIG. 11 illustrates a functional block diagram of a multimode device 1100, in accordance with certain aspects of the present disclosure. The multimode device may include a user capability determining component 1102 for determining if a device is capable of supporting voice or SMS service. An attach type determining component 1104 may be used to determine type of attach based on the home network preference for voice and SMS services. A voice domain selecting component 1106 may be used to select a voice domain for the device utilizing the proposed algorithm. A SMS domain selecting component 1108 may be used to select a SMS domain utilizing the proposed method.

The various operations of methods described above may be performed by various hardware and/or software component(s) and/or module(s) corresponding to means-plus-function blocks illustrated in the Figures. For example, means for determining device capabilities may include a circuit or a processor capable of determining user capabilities, such as the user capability determining component 1102. Means for determining an attach type may include a circuit or a processor capable of determining an attach type, such as the attach type determining component 1104. Means for selecting a voice domain may comprise any suitable component capable of determining the voice domain, such as the voice domain determining component 1106. Means for selecting an SMS domain may comprise any suitable component capable of selecting an SMS domain, such as the SMS domain selecting component 1108.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
   determining a multi-mode device that has camped on a packet switched radio access technology (RAT) network is capable of supporting a voice service;
   determining an attach type from a plurality of attach types based on first parameters of a home network and voice service capability;
   selecting a first domain from a first plurality of domains for the voice service over the packet switched RAT network utilizing the attach type and one or more second parameters, wherein the first plurality of domains comprise single carrier-circuit switched fall back (1xCSFB) domain; and
   if the multi-mode device is capable of supporting short message service (SMS), selecting, from a second plurality of domains, a second domain for SMS over the packet switched RAT network utilizing the one or more second parameters and registration information about the selected first domain.

2. The method of claim 1, wherein the one or more second parameters comprise home operator preferences, visited operator preferences, visited operator capabilities, and user settings.

3. The method of claim 1, further comprising:
receiving a system information block (SIB) message; and
selecting the first or the second domain utilizing information included in the SIB message.

4. The method of claim 1, further comprising:
determining priorities of the first and the second plurality of domains; and
selecting the first and the second domain based on the determined priorities.

5. The method of claim 1, further comprising:
disabling the packet switched RAT network temporarily if the multi-mode device is unable to select at least one of the first or the second domains; and
selecting another RAT that supports voice service or SMS.

6. The method of claim 5, further comprising:
initializing a timer with a predetermined value while disabling the packet switched RAT network; and
trying to establish a connection with the disabled packet switched RAT network after the timer expires.

7. The method of claim 1, further comprising:
re-selecting the first domain if a higher priority domain becomes available.

8. The method of claim 1, wherein the plurality of attach types comprise circuit switched (CS)-only voice service, CS-preferred voice service, packet switched (PS)-only voice service, and PS-preferred voice service.

9. The method of claim 1, wherein selecting the second domain comprises:
selecting a second attach type from a second plurality of attach types comprising packet switched (PS) preferred, and PS not allowed.

10. The method of claim 1, wherein the packet switched RAT network comprises long term evolution (LTE).

11. The method of claim 1, further comprising:
receiving a system information block (SIB) message; and
determining if the packet switched RAT network is a 3rd generation partnership project (3GPP) long term evolution (LTE) or a 3GPP2 LTE network based on the received SIB.

12. The method of claim 1, further comprising:
registering to at least one of the first or the second domains.

13. The method of claim 12, further comprising:
selecting a third domain if the multi-mode device is unable to register to the first domain.

14. The method of claim 1, wherein the 1xCSFB domain has a lower priority than a CSFB domain that is in compliance with a third generation partnership project (3GPP).

15. A method for wireless communications, comprising:
determining, by a user device, an attach type based on one or more first parameters of a home operator and capabilities of the user device;
selecting, by the user device and from a plurality of domains, a domain for short message service (SMS) over a packet switched radio access technology (RAT) network based, at least in part, on registration information of a selected first domain and one or more second parameters, wherein the one or more second parameters comprise one or more of home operator preferences, visited operator preferences, visited operator capabilities, or user settings, wherein the plurality of domains comprise SMS over S102 interface, and wherein the one or more second parameters comprise home operator preferences and at least one of visited operator preferences or visited operator capabilities.

16. The method of claim 15, further comprising:
performing registration procedures according to the selected domain; and
selecting another domain for SMS if the device is unable to successfully register to the selected domain.

17. The method of claim 15, further comprising:
disabling the packet switched RAT network if the device is unable to successfully register to the selected domain.

18. The method of claim 15, wherein the packet switched RAT network comprises long term evolution (LTE).

19. An apparatus for wireless communications, comprising:
means for determining a multi-mode device that has camped on a packet switched radio access technology (RAT) network is capable of supporting a voice service;
means for determining an attach type from a plurality of attach types based on first parameters of a home network and voice service capability;
means for selecting a first domain from a first plurality of domains for the voice service over the RAT utilizing the attach type and one or more second parameters, wherein the first plurality of domains comprise single carrier-circuit switched fall back (1xCSFB) domain; and
means for selecting, from a second plurality of domains, a second domain for short message service (SMS) over the packet switched RAT network utilizing the one or more second parameters and registration information about the selected first domain if the multi-mode device is capable of supporting SMS.

20. The apparatus of claim 19, wherein the one or more second parameters comprise home operator preferences, visited operator preferences, visited operator capabilities, and user settings.

21. The apparatus of claim 19, further comprising:
means for receiving a system information block (SIB) message; and
means for selecting the first or the second domain utilizing information included in the SIB message.

22. The apparatus of claim 19, further comprising:
means for determining priorities of the first and the second plurality of domains; and means for selecting the first and the second domain based on the determined priorities.

23. The apparatus of claim 19, further comprising:
means for disabling the packet switched RAT network temporarily if the multi-mode device is unable to select at least one of the first or the second domains; and
means for selecting another RAT that supports voice service or SMS.

24. The apparatus of claim 23, further comprising:
means for initializing a timer with a predetermined value while disabling the packet switched RAT network; and
means for trying to establish a connection with the disabled packet switched RAT network after the timer expires.

25. The apparatus of claim 19, further comprising:
means for re-selecting the first domain if a higher priority domain becomes available.

26. The apparatus of claim 19, wherein the plurality of attach types comprise circuit switched (CS)-only voice service, CS-preferred voice service, packet switched (PS)-only voice service, and PS-preferred voice service.

27. The apparatus of claim 19, wherein the means for selecting the second domain comprises:
means for selecting a second attach type from a second plurality of attach types comprising packet switched (PS) preferred, and PS not allowed.

28. The apparatus of claim 19, wherein the packet switched RAT network comprises long term evolution (LTE).

29. The apparatus of claim 19, further comprising:
means for receiving a system information block (SIB) message; and
means for determining if the packet switched RAT network is a 3rd generation partnership project (3GPP) long term evolution (LTE) or a 3GPP2 LTE network based on the received SIB.

30. The apparatus of claim 19, further comprising:
means for registering to at least one of the first or the second domains.

31. The apparatus of claim 30, further comprising:
means for selecting a third domain if the multi-mode device is unable to register to the first domain.

32. The apparatus of claim 19, wherein the 1xCSFB domain has a lower priority than a CSFB domain that is in compliance with a third generation partnership project (3GPP).

33. An apparatus for wireless communications, comprising: means for determining an attach type for the apparatus based on one or more first parameters of a home operator and capabilities of the apparatus; means for selecting, from a plurality of domains, a domain for short message service (SMS) over a packet switched radio access technology (RAT) network based, at least in part, on registration information of a selected first domain and one or more second parameters, wherein the one or more second parameters comprise one or more of home operator preferences, visited operator preferences, visited operator capabilities, or user settings, wherein the plurality of domains comprise SMS over S102 interface, and wherein the one or more second parameters comprise home operator preferences and at least one of visited operator preferences or visited operator capabilities.

34. The apparatus of claim 33, further comprising:
means for performing registration procedures according to the selected domain; and
means for selecting another domain for SMS if the apparatus is unable to successfully register to the selected domain.

35. The apparatus of claim 33, further comprising:
means for disabling the packet switched RAT network if the apparatus is unable to successfully register to the selected domain.

36. The apparatus of claim 33, wherein the packet switched RAT network comprises long term evolution (LTE).

37. An apparatus for wireless communications, comprising:
at least one processor configured to determine a multi-mode device that has camped on a packet switched radio access technology (RAT) network is capable of supporting a voice service, determine an attach type from a plurality of attach types based on first parameters of a home network and voice service capability, select a first domain from a first plurality of domains for the voice service over the packet switched RAT network utilizing the attach type and one or more second parameters, wherein the first plurality of domains comprise single carrier-circuit switched fall back (1xCSFB) domain, and, if the multi-mode device is capable of supporting short message service (SMS), selecting, from a second plurality of domains, a second domain for SMS over the packet switched RAT network utilizing the one or more second parameters and registration information about the selected first domain; and
a memory coupled with the at least one processor.

38. An apparatus for wireless communications, comprising: at least one processor configured to determine an attach type for the apparatus based on one or more first parameters of a home operator and capabilities of the apparatus and select, from a plurality of domains, a domain for short message service (SMS) over a packet switched radio access technology (RAT) network based, at least in part, on registration information of a selected first domain and one or more second parameters, wherein the one or more second parameters comprise one or more of home operator preferences, visited operator preferences, visited operator capabilities, or user settings, wherein the plurality of domains comprise SMS over S102 interface; a memory coupled with the at least one processor, and wherein the one or more second parameters comprise home operator preferences and at least one of visited operator preferences or visited operator capabilities.

39. A non-transitory computer readable medium having instructions stored thereon which, when executed by one or more processors, cause the one or more processors to:
determine a multi-mode device that has camped on a packet switched radio access technology (RAT) network is capable of supporting a voice service;
determine an attach type from a plurality of attach types based on first parameters of a home network and voice service capability;
select a first domain from a first plurality of domains for the voice service over the packet switched RAT network utilizing the attach type and one or more second parameters, wherein the first plurality of domains comprise single carrier-circuit switched fall back (1xCSFB) domain; and
if the multi-mode device is capable of supporting short message service (SMS), select, from a second plurality of domains, a second domain for SMS over the packet switched RAT network utilizing the one or more second parameters and registration information about the selected first domain.

40. A non-transitory computer readable medium having instructions stored thereon, which, when executed by one or more processors of a user device, cause the one or more processors to:
determine an attach type for the user device, based on one or more first parameters of a home operator and capabilities of the user device;
select, from a plurality of domains, a domain for short message service (SMS) over a packet switched radio access technology (RAT) network based, at least in part, on registration information of a selected first domain and one or more second parameters, wherein the one or more second parameters comprise one or more of home operator preferences, visited operator preferences, visited operator capabilities, or user settings, wherein the plurality of domains comprise SMS over S102 interface, and wherein the one or more second parameters comprise home operator preferences and at least one of visited operator preferences or visited operator capabilities.

* * * * *